(12) United States Patent
Ren et al.

(10) Patent No.: US 12,524,154 B2
(45) Date of Patent: Jan. 13, 2026

(54) SYSTEM AND METHOD USING METADATA TO DIRECTLY READ TARGET DATA IN STORAGE NODES

(71) Applicant: HUAWEI TECHNOLOGIES CO., LTD., Shenzhen (CN)

(72) Inventors: Ren Ren, Shanghai (CN); Pingjing Guo, Shanghai (CN); Junjie Yang, Shanghai (CN); Lijie Ye, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/674,776

(22) Filed: May 24, 2024

(65) Prior Publication Data

US 2024/0311013 A1    Sep. 19, 2024

Related U.S. Application Data

(63) Continuation of application No. PCT/CN2022/107045, filed on Jul. 21, 2022.

(30) Foreign Application Priority Data

Nov. 25, 2021  (CN) .......................... 202111413317.4

(51) Int. Cl.
*G06F 3/06* (2006.01)
(52) U.S. Cl.
CPC .......... *G06F 3/0611* (2013.01); *G06F 3/0641* (2013.01); *G06F 3/067* (2013.01)
(58) Field of Classification Search
None
See application file for complete search history.

(56) References Cited

U.S. PATENT DOCUMENTS 6,208,999 B1 *  3/2001  Spilo .................. G06F 11/1435
7,475,321 B2 *  1/2009  Gurumurthi ........ G06F 11/0724
                                                           711/155

(Continued)

FOREIGN PATENT DOCUMENTS

CN        112527186 A        3/2021
EP           381447 A  *    8/1990   ......... G06F 12/0855

(Continued)

OTHER PUBLICATIONS

Kevin Deierling, "What is DPU?", May 20, 2020, pp. 1-6, https://blogs.nvidia.com/blog/whats-a-dpu-data-processing-unit/ (Year: 2020).*

(Continued)

*Primary Examiner* — Christopher D Birkhimer
(74) *Attorney, Agent, or Firm* — Leydig, Voit & Mayer, Ltd.

(57) ABSTRACT

A data storage system, an intelligent network interface card, and a compute node are provided, and belong to the field of data storage. The data storage system includes a compute node and a plurality of storage nodes. The compute node stores metadata, and the metadata may indicate an address at which target data is stored in the plurality of storage nodes. According to this application, the compute node may directly read the target data from a corresponding storage node based on the address indicated by the metadata stored in the compute node, does not need to perform cross-node data forwarding by using the plurality of storage nodes, and does not need to perform a plurality of times of metadata searching. This effectively reduces a data reading delay and improves a data reading speed.

20 Claims, 5 Drawing Sheets

(56) References Cited

U.S. PATENT DOCUMENTS

| | | | | |
|---|---|---|---|---|
| 8,396,841 B1* | 3/2013 | Janakiraman | G06F 3/0608 | 707/802 |
| 8,429,359 B1* | 4/2013 | Desai | G06F 11/1461 | 711/E12.103 |
| 8,538,919 B1* | 9/2013 | Nielsen | H04L 63/0272 | 718/1 |
| 8,572,163 B1* | 10/2013 | Bromley | G06F 16/1748 | 707/650 |
| 8,593,678 B2* | 11/2013 | Ohishi | H04N 1/2166 | 358/1.15 |
| 8,732,403 B1* | 5/2014 | Nayak | G06F 3/0619 | 711/170 |
| 9,075,705 B2* | 7/2015 | Hikichi | G06F 11/004 | |
| 9,092,182 B2* | 7/2015 | Ohishi | H04N 1/00944 | |
| 9,344,596 B2* | 5/2016 | Ohishi | H04N 1/00973 | |
| 9,715,434 B1* | 7/2017 | Xu | G06F 3/067 | |
| 9,733,836 B1* | 8/2017 | Garg | G06F 3/0631 | |
| 9,800,291 B1* | 10/2017 | Ben David | G06F 11/1415 | |
| 9,892,803 B2* | 2/2018 | Reed | G06F 12/0811 | |
| 10,108,543 B1* | 10/2018 | Duggal | G06F 11/14 | |
| 10,108,544 B1* | 10/2018 | Duggal | G06F 11/14 | |
| 10,228,858 B1* | 3/2019 | Stoakes | G06F 3/0641 | |
| 10,346,076 B1* | 7/2019 | Jonnala | G06F 3/067 | |
| 10,365,983 B1* | 7/2019 | Foley | G06F 11/2094 | |
| 10,430,279 B1* | 10/2019 | Dittia | G06F 3/0656 | |
| 10,664,165 B1* | 5/2020 | Faibish | G06F 3/0638 | |
| 10,795,812 B1* | 10/2020 | Duggal | G06F 3/067 | |
| 10,866,742 B1* | 12/2020 | Patterson | G06F 3/067 | |
| 11,119,668 B1* | 9/2021 | Keller | G06F 3/064 | |
| 11,144,399 B1* | 10/2021 | Yarimi | G06F 11/2094 | |
| 11,550,479 B1* | 1/2023 | Shatsky | G06F 3/0613 | |
| 11,704,043 B1* | 7/2023 | Throgmorton | G06F 11/1469 | 711/162 |
| 2004/0039880 A1* | 2/2004 | Pentkovski | G06F 12/0811 | 711/146 |
| 2004/0117414 A1* | 6/2004 | Braun | G06F 8/65 | |
| 2006/0005074 A1* | 1/2006 | Yanai | G06F 3/0619 | 714/6.32 |
| 2006/0143406 A1* | 6/2006 | Chrysos | G06F 12/0811 | 711/143 |
| 2006/0156155 A1* | 7/2006 | Gurumurthi | G06F 11/0793 | 714/746 |
| 2008/0140902 A1* | 6/2008 | Townsend | H04B 1/0475 | 710/306 |
| 2008/0144079 A1* | 6/2008 | Pandey | H03M 7/30 | 358/1.15 |
| 2008/0307020 A1* | 12/2008 | Ko | G06F 21/6245 | |
| 2009/0041230 A1* | 2/2009 | Williams | G06F 11/1448 | 707/999.204 |
| 2009/0089483 A1* | 4/2009 | Tanaka | G06F 3/0608 | 711/E12.008 |
| 2009/0204650 A1* | 8/2009 | Wong | G06F 16/1744 | |
| 2010/0077013 A1* | 3/2010 | Clements | G06F 16/1748 | 707/822 |
| 2010/0082672 A1* | 4/2010 | Kottomtharayil | G06F 11/1451 | 711/E12.001 |
| 2010/0088296 A1* | 4/2010 | Periyagaram | G06F 16/183 | 707/E17.014 |
| 2010/0125553 A1* | 5/2010 | Huang | G06F 11/1453 | 707/661 |
| 2010/0174881 A1* | 7/2010 | Anglin | G06F 11/1453 | 711/E12.103 |
| 2010/0281081 A1* | 11/2010 | Stager | G06F 9/5022 | 707/814 |
| 2010/0333116 A1* | 12/2010 | Prahlad | G06Q 50/188 | 713/153 |
| 2011/0236049 A1* | 9/2011 | Haga | G03G 15/5004 | 399/75 |
| 2011/0302358 A1* | 12/2011 | Yu | G06F 11/108 | 711/E12.008 |
| 2013/0024423 A1* | 1/2013 | Doshi | G06F 11/1448 | 707/640 |
| 2013/0173554 A1* | 7/2013 | Ubukata | G06F 11/2094 | 707/640 |
| 2014/0114932 A1* | 4/2014 | Mallaiah | G06F 3/0641 | 707/E17.032 |
| 2015/0161000 A1* | 6/2015 | Kim | G06F 3/0608 | 714/6.24 |
| 2015/0205816 A1* | 7/2015 | Periyagaram | G06F 11/1453 | 707/827 |
| 2015/0261776 A1* | 9/2015 | Attarde | G06F 16/1748 | 707/664 |
| 2016/0196216 A1* | 7/2016 | Lee | G06F 3/0631 | 711/170 |
| 2016/0196320 A1* | 7/2016 | Borowiec | G06F 3/061 | |
| 2016/0246799 A1* | 8/2016 | Constantinescu | G06F 16/1748 | |
| 2016/0350324 A1* | 12/2016 | Wang | G06F 16/137 | |
| 2017/0010809 A1* | 1/2017 | Hironaka | G06F 3/0689 | |
| 2017/0038978 A1* | 2/2017 | Li | G06F 3/0611 | |
| 2017/0132082 A1* | 5/2017 | Resch | G06F 11/1076 | |
| 2017/0132086 A1* | 5/2017 | Blackburn | G06F 11/1466 | |
| 2017/0300422 A1* | 10/2017 | Szubbocsev | G06F 12/1009 | |
| 2018/0138921 A1* | 5/2018 | Arelakis | H03M 7/3071 | |
| 2018/0314727 A1* | 11/2018 | Epstein | G06N 5/01 | |
| 2019/0215365 A1* | 7/2019 | Chopra | G06F 3/067 | |
| 2020/0065256 A1* | 2/2020 | Palmer | G06F 16/2246 | |
| 2020/0089420 A1* | 3/2020 | Sharoni | G06F 21/79 | |
| 2020/0133773 A1* | 4/2020 | Lingarajappa | G06F 11/1076 | |
| 2020/0183846 A1* | 6/2020 | Cui | G06F 12/082 | |
| 2020/0250104 A1* | 8/2020 | Byun | G06F 12/10 | |
| 2020/0250158 A1* | 8/2020 | Hutchison | G06F 3/0683 | |
| 2020/0264985 A1* | 8/2020 | Lee | G06F 12/1009 | |
| 2020/0310686 A1* | 10/2020 | Truong | G06F 3/061 | |
| 2020/0349084 A1* | 11/2020 | Byun | G06F 12/0873 | |
| 2020/0356282 A1* | 11/2020 | Wu | G06F 3/0613 | |
| 2020/0409849 A1* | 12/2020 | Nallan Chakravarthi | G06F 12/0815 | |
| 2021/0036714 A1* | 2/2021 | Martin | G06F 13/1668 | |
| 2021/0318826 A1* | 10/2021 | Wei | G06F 3/067 | |
| 2021/0326207 A1* | 10/2021 | Zhan | G06F 11/1092 | |
| 2021/0374021 A1* | 12/2021 | Santhakumar | G06F 3/067 | |
| 2022/0035788 A1* | 2/2022 | Aharoni | G06F 16/908 | |
| 2022/0121563 A1* | 4/2022 | Kamran | G06F 3/0688 | |
| 2022/0155986 A1* | 5/2022 | Meiri | G06F 3/0641 | |
| 2022/0187991 A1* | 6/2022 | Keller | G06F 3/0659 | |
| 2022/0222113 A1* | 7/2022 | Shatsky | G06F 9/505 | |
| 2022/0342758 A1* | 10/2022 | Tal | G06F 3/067 | |
| 2022/0414102 A1* | 12/2022 | Shatsky | G06F 16/24552 | |
| 2023/0068214 A1* | 3/2023 | Inglis | G06F 3/0635 | |
| 2023/0112692 A1* | 4/2023 | Richard | G06F 3/0604 | 711/154 |

FOREIGN PATENT DOCUMENTS

| | | | | |
|---|---|---|---|---|
| TW | 201214170 A | * | 4/2012 | G06F 3/0641 |
| WO | WO-2013157103 A1 | * | 10/2013 | G06F 3/0608 |

OTHER PUBLICATIONS

Kevin Deierling, "Achieving a Cloud-Scale Architecture with DPUs", Jun. 18, 2021, pp. 1-7, https://web.archive.org/web/20210619040517/https://developer.nvidia.com/blog/achieving-a-cloud-scale-architecture-with-dpus/ (Year: 2021).*

Martin H. Davis, "An Intelligent Network Interface Card", IEEE, 1999, pp. 1-6, https://ieeexplore.ieee.org/stamp/stamp.jsp?tp=&arnumber=822056 (Year: 1999).*

David Geer, "Reducing the Storage Burden via Data Deduplication", Industry Trends, Dec. 2008, pp. 15-17, https://ieeexplore.ieee.org/stamp/stamp.jsp?tp=&arnumber=4712493 (Year: 2008).*

* cited by examiner

SYSTEM AND METHOD USING METADATA TO DIRECTLY READ TARGET DATA IN STORAGE NODES

CROSS-REFERENCE TO RELATED APPLICATIONS

This application is a continuation of International Application No. PCT/CN2022/107045, filed on Jul. 21, 2022, which claims priority to Chinese Patent Application No. 202111413317.4 filed on Nov. 25, 2021. The disclosures of the aforementioned applications are hereby incorporated by reference in their entireties.

TECHNICAL FIELD

Embodiments of this application relate to the field of data storage, and in particular, to a data storage system, an intelligent network interface card, and a compute node.

BACKGROUND

Currently, in a data reading process, cross-node data forwarding or a plurality of times of metadata searching may be performed, which affects a data reading speed. For example, when deduplication data obtained through deduplication is read, fingerprint information of the deduplication data and the deduplication data may be forwarded between different storage nodes. However, cross-node data forwarding generates a delay, and this reduces the data reading speed. For another example, when snapshot data is read, metadata of a plurality of levels of snapshot volumes may be accessed to find metadata of the to-be read snapshot data, and then the snapshot data is obtained based on the metadata. However, a plurality of times of metadata access also increase a reading delay of the snapshot data.

SUMMARY

Embodiments of this application provide a data storage system, an intelligent network interface card, and a compute node, to effectively reduce a data reading delay and improve a data reading speed. The technical solutions are as follows.

According to a first aspect, a data storage system is provided. The data storage system includes a compute node and a plurality of storage nodes, and the storage nod is configured to persistently store target data. The compute node stores metadata, and the metadata indicates an address at which target data is stored in the plurality of storage nodes. The compute node is configured to obtain the metadata, and read the target data in the storage node based on the metadata.

In embodiments of this application, the compute node stores metadata, where the metadata may indicate the address at which target data is stored in the plurality of storage nodes. In this way, the compute node may directly read the target data from the corresponding storage node based on the address indicated by the metadata stored in the compute node, cross-node data forwarding does not need to be performed by using the plurality of storage nodes, and the metadata does not need to be searched for a plurality of times. This effectively reduces a data reading delay and improves a data reading speed.

Optionally, the compute node includes an intelligent network interface card, and the intelligent network interface card includes a storage unit and a compute unit. The storage unit is configured to store the metadata. The compute unit is configured to obtain the metadata, and read the target data in the storage node based on the metadata.

The intelligent network interface card may be a data processing unit DPU.

In embodiments of this application, the intelligent network interface card is deployed in the compute node. In this way, the metadata may be stored in the storage unit of the intelligent network interface card. When reading data, the intelligent network interface card may control the compute unit of the intelligent network interface card to obtain the metadata stored in the storage unit of the intelligent network interface card, and read the target data from the corresponding storage node based on the address indicated by the metadata. In this way, workload of the compute node can be reduced, and a CPU resource of the compute node can be released.

Optionally, the metadata includes a correspondence between a logical address and physical address information. In this case, the compute unit is configured to: obtain a read request, where the read request includes a first logical address; search the correspondence for first physical address information corresponding to the first logical address; and read the target data in the storage node based on the found first physical address information.

The physical address information includes fingerprint information of deduplication data or a physical address of snapshot data.

In embodiments of this application, the metadata stored in the intelligent network interface card includes the correspondence between the logical address and the physical address information. After obtaining the read request of the data, based on the first logical address included in the read request, the intelligent network interface card may directly search, for the first physical address information corresponding to the first logical address, the correspondence that is between the logical address and the physical address information and that is stored in the intelligent network interface card. Further, the intelligent network interface card may determine, based on the found first physical address information, the storage node in which the target data required by a user is located, then directly read the target data from the storage node, and does not need to search for the target data from the plurality of storage nodes and perform cross-node data forwarding or a plurality of times of metadata search. In this way, a data reading delay caused by cross-node data forwarding or a plurality of times of metadata search can be effectively reduced, and a data reading speed is improved.

Optionally, the intelligent network interface card further includes an input/output I/O unit. In this case, the compute unit is further configured to: when the first physical address information is not found, control the I/O unit to send the read request to the storage node.

The storage node is configured to: obtain the first physical address information, obtain the target data in the storage node based on the first physical address information, and send the obtained target data and the first physical address information to the I/O unit. The I/O unit is configured to correspondingly store the first logical address and the first physical address information in the storage unit.

In embodiments of this application, when the intelligent network interface card does not find the first physical address information, the intelligent network interface card may deliver the read request to the storage node, and the storage node obtains the first physical address information and the corresponding target data based on the read request. In this way, when returning the target data subsequently, the storage node may also return the first physical address information to the intelligent network interface card. In this way, the intelligent network interface card may correspondingly store the first logical address and the first physical address information in the correspondence, so that when the read request including the first logical address is subsequently obtained again, data is directly read based on data stored in the correspondence. This simplifies a data read process and improves a data reading speed.

Optionally, the intelligent network interface card further includes an I/O unit, the metadata further includes a fingerprint information set, and the fingerprint information set includes the fingerprint information of the deduplication data stored in the plurality of storage nodes. In this case, the compute unit is further configured to: obtain a write request, where the write request includes a second logical address and to-be-written data; determine fingerprint information of the to-be-written data; and if the fingerprint information of the to-be-written data is found in the fingerprint information set, correspondingly store the second logical address and the fingerprint information of the to-be-written data in the storage unit, delete the to-be-written data, and control the I/O unit to send the fingerprint information of the to-be-written data and the second logical address to the storage node. The storage node is further configured to correspondingly store the second logical address and the fingerprint information of the to-be-written data.

In embodiments of this application, after obtaining the write request of the data, the intelligent network interface card may first compute the fingerprint information of the to-be-written data, and then search the fingerprint information set for the fingerprint information of the to-be-written data. If the fingerprint information is found, the intelligent network interface card needs to send only the second logical address and the fingerprint information of the to-be-written data that are included in the write request to a home storage node of the second logical address for corresponding storage, and does not need to send the to-be-written data to the home storage node of the second logical address. In this way, a bandwidth resource between the compute node and the storage node can be effectively saved.

Optionally, the compute unit is further configured to: if the fingerprint information of the to-be-written data is not found in the fingerprint information set, control the I/O unit to send the write request to the storage node. The storage node is configured to store the to-be-written data based on the write request.

Optionally, the compute unit is further configured to: after the storage node stores the to-be-written data, search the correspondence for physical address information corresponding to the second logical address, and if the physical address information corresponding to the second logical address is found, update the physical address information corresponding to the second logical address to the fingerprint information of the to-be-written data.

In embodiments of this application, after the storage node stores the to-be-written data, if the compute unit finds the physical address information corresponding to the second logical address from the correspondence, because the to-be-written data is just written into the second logical address, and a generation time point of the physical address information corresponding to the second logical address in the correspondence is earlier than a time point at which the to-be-written data is written into the second logical address, it can be learned that the physical address information corresponding to the second logical address in the correspondence is invalid. The compute unit may update the physical address information corresponding to the second logical address, to ensure accuracy of data stored in the correspondence.

According to a second aspect, an intelligent network interface card is provided. The intelligent network interface card stores metadata, where the metadata indicates an address at which target data is stored in a plurality of storage nodes. The intelligent network interface card is configured to: obtain the metadata, and read the target data in the storage node based on the metadata.

The intelligent network interface card is a data processing unit DPU.

Optionally, the intelligent network interface card includes a storage unit and a compute unit. The storage unit is configured to store the metadata. The compute unit is configured to: obtain the metadata, and read the target data in the storage node based on the metadata.

Optionally, the metadata includes a correspondence between a logical address and physical address information. In this case, the compute unit may be configured to: obtain a read request, where the read request includes a first logical address; search the correspondence for first physical address information corresponding to the first logical address; and read the target data in the storage node based on the found first physical address information.

The physical address information includes fingerprint information of deduplication data or a physical address of snapshot data.

Optionally, the intelligent network interface card further includes an input/output I/O unit. In this case, the compute unit is further configured to: when the first physical address information is not found, control the I/O unit to send the read request to the storage node.

The I/O unit is configured to: receive the target data and the first physical address information that is obtained by the storage node based on the read request, and correspondingly store the first logical address and the first physical address information in the storage unit.

Optionally, the intelligent network interface card further includes an I/O unit, the metadata further includes a fingerprint information set, and the fingerprint information set includes the fingerprint information of the deduplication data stored in the plurality of storage nodes. In this case, the compute unit is further configured to: obtain a write request, where the write request includes a second logical address and to-be-written data; determine fingerprint information of the to-be-written data; and if the fingerprint information of the to-be-written data is found in the fingerprint information set, correspondingly store the second logical address and the fingerprint information of the to-be-written data in the storage unit, delete the to-be-written data, and control the I/O unit to send the fingerprint information of the to-be-written data and the second logical address to the storage node, so that the storage node correspondingly stores the second logical address and the fingerprint information of the to-be-written data.

Optionally, the compute unit is further configured to: if the fingerprint information of the to-be-written data is not found in the fingerprint information set, control the I/O unit to send the write request to the storage node, to indicate the storage node to store the to-be-written data based on the write request.

Optionally, the compute unit is further configured to: after the storage node stores the to-be-written data, search the correspondence for physical address information corresponding to the second logical address, and if the physical address information corresponding to the second logical address is found, update the physical address information corresponding to the second logical address to the fingerprint information of the to-be-written data.

According to a third aspect, a compute node is provided. The compute node includes the intelligent network interface card according to the second aspect. In addition, the compute node may further include a processor and a memory. The processor is configured to perform data computing and processing, for example, deduplication, data compression, data fragmentation, and multi-copy processing. The memory is configured to directly exchange data with the processor.

According to a fourth aspect, a computer-readable storage medium is provided. The computer-readable storage medium stores instructions. When the instructions are run on a computer, the computer is enabled to perform the steps performed by the compute node or the intelligent network interface card in the data storage system according to the first aspect, or perform the steps performed by the intelligent network interface card according to the second aspect.

According to a fifth aspect, a computer program product including instructions is provided. When the computer program product runs on a computer, the computer is enabled to implement a function of the compute node or the intelligent network interface card in the data storage system according to the first aspect, or the computer is enabled to implement a function of the intelligent network interface card according to the second aspect.

Technical effects achieved in the second aspect, the third aspect, the fourth aspect, and the fifth aspect are similar to those achieved by corresponding technical means in the first aspect. Details are not described again herein.

The technical solutions provided in embodiments of this application bring the following beneficial effects.

In embodiments of this application, the compute node stores the metadata, where the metadata may indicate the address at which the target data is stored in the plurality of storage nodes. In this way, the compute node may directly read the target data from the corresponding storage node based on the address indicated by the metadata stored in the compute node, cross-node data forwarding does not need to be performed by using the plurality of storage nodes, and the metadata does not need to be searched for a plurality of times. This effectively reduces a data reading delay and improves a data reading speed.

DESCRIPTION OF EMBODIMENTS

To make the objectives, technical solutions, and advantages of embodiments of this application clearer, the following further describes the implementations of this application in detail with reference to the accompanying drawings.

Before embodiments of this application are described in detail, application scenarios in embodiments of this application are described first.

As a high-performance storage medium and a communication network are gradually mature, a storage service process needs to be simplified to improve an access speed. However, currently, in some data access scenarios, a plurality of times of cross-node data forwarding or a plurality of times of metadata search may be involved, resulting in a long data access delay.

For example, when persistent data storage is performed currently, a deduplication technology may be used to reduce storage of duplicated data, thereby reducing network and system loads. The deduplication technology refers to that, when data is written, fingerprint information of the to-be-written data is first determined, and whether data that is the same as the to-be-written data is already stored in a storage node is identified based on the fingerprint information of the to-be-written data. If the data that is the same as the to-be-written data is already stored, the to-be-written data is discarded, and the fingerprint information of the to-be-written data is retained to point to the data that is stored in the storage node and that is the same as the to-be-written data. In this way, data redundancy is eliminated and storage capacity requirements are reduced. The data that is stored in the storage node and that is the same as the to-be-written data is a piece of deduplication data. Based on this, refer to FIG. 1. When read data is deduplication data, a compute node delivers a read request to a home storage node A of a logical address based on the logical address included in the obtained read request. However, the storage node A may not store the deduplication data, but stores fingerprint information of the deduplication data. In this case, after receiving the read request, the storage node A first obtains the fingerprint information corresponding to the logical address in the read request, and then sends, based on the fingerprint information, a read request to a storage node B that stores the deduplication data. After obtaining the read request sent by the storage node A, the storage node B searches, based on the fingerprint information included in the read request, metadata stored in the storage node B for a physical address corresponding to the fingerprint information, reads the deduplication data stored at the physical address, and then returns the read deduplication data to the storage node A. Correspondingly, the storage node A receives the deduplication data sent by the storage node B, and feeds back the received deduplication data to the compute node. In such a data reading process, the fingerprint information of the deduplication data and the deduplication data need to be forwarded between different storage nodes. However, cross-node data forwarding generates a delay, and this reduces a data reading speed.

Figure 2:
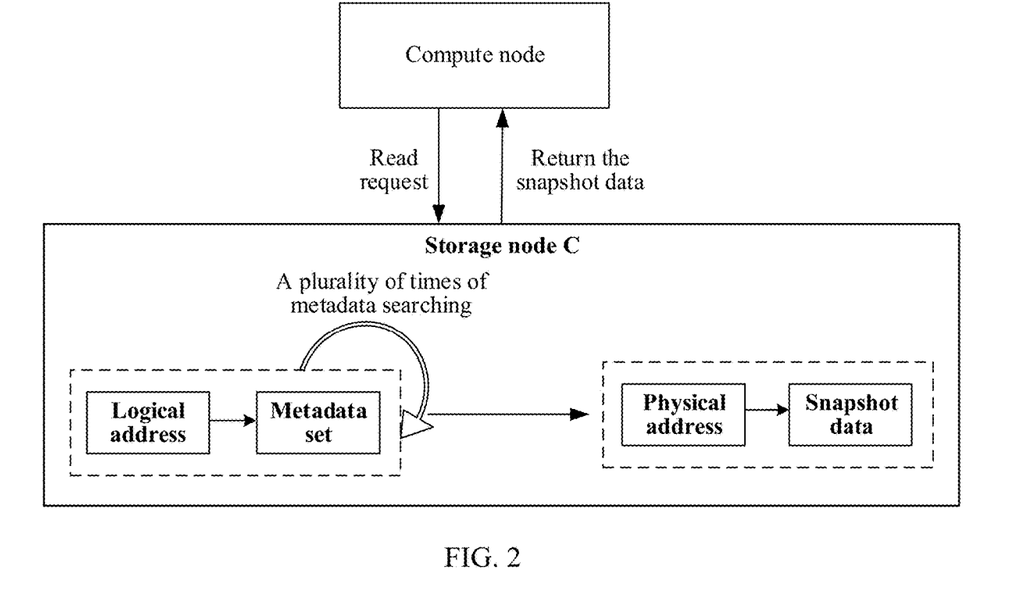
FIG. 2 is a schematic diagram of reading snapshot data in the conventional technology according to an embodiment of this application.

For another example, a snapshot technology may be used when data in a data storage system is backed up. The snapshot technology refers to that data is backed up at intervals, and when metadata of data is damaged or another backup method fails, snapshot data may be read to restore the data and the metadata of the data. When a snapshot is taken for data, a snapshot is first taken for original data to obtain a level-1 snapshot, and subsequently, a snapshot may be further taken for the level-1 snapshot again to obtain a level-2 snapshot. In this case, the level-1 snapshot is a parent snapshot of the level-2 snapshot, and the level-2 snapshot is a child snapshot of the level-1 snapshot. In this way, a plurality of levels of snapshots for one piece of original data may be obtained. Each level of snapshot corresponds to one metadata set. Based on this, refer to FIG. 2. When read data is snapshot data, a compute node delivers a read request to a home storage node C of a logical address based on the logical address included in the obtained read request. After receiving the read request, the storage node C first searches, for a physical address corresponding to the logical address, a metadata set corresponding to a snapshot volume indicated by the logical address. If the physical address is not found, the physical address corresponding to the logical address may continue to be searched for in a metadata set corresponding to a parent snapshot volume of the snapshot volume. If the physical address is still not found, the physical address corresponding to the logical address is searched for in a metadata set corresponding to a parent snapshot volume of the parent snapshot volume of the snapshot volume. After the physical address corresponding to the logical address is found, snapshot data stored in the physical address is read. It can be seen that, when the snapshot data is read, it may be necessary to search for metadata of a plurality of levels of snapshot volumes to find the physical address of the snapshot data required by the user, and a plurality of metadata search processes also increase a reading delay of the snapshot data.

Figure 3:
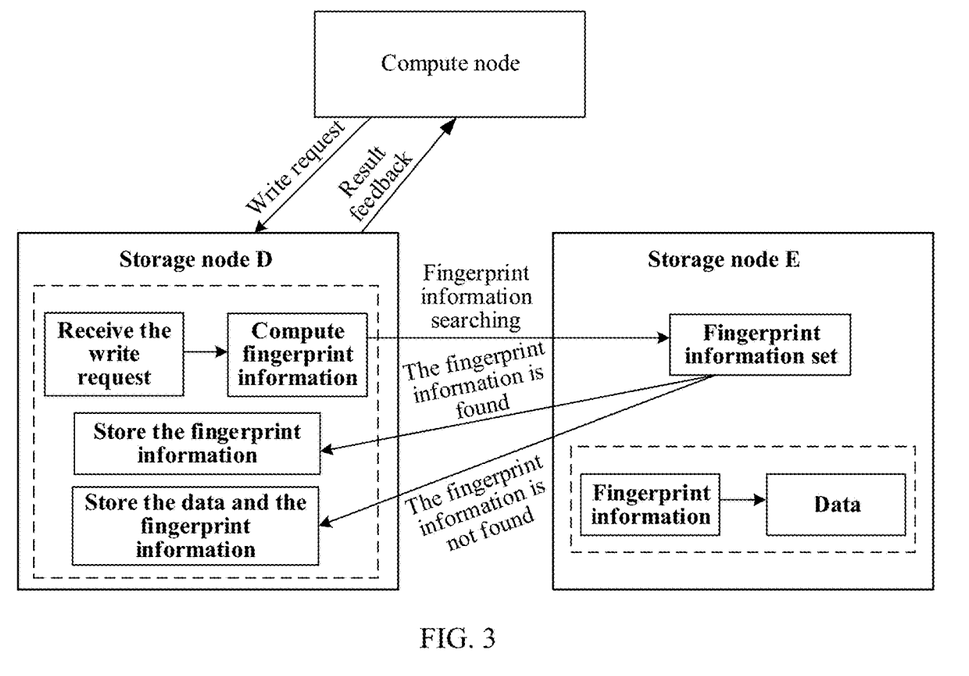
FIG. 3 is a schematic diagram of persistently writing data into a storage node in the conventional technology according to an embodiment of this application.

For another example, refer to FIG. 3. Currently, when data is written by using a deduplication technology, after obtaining a write request that carries to-be-written data and a logical address allocated to the to-be-written data, a compute node sends the to-be-written data to a home storage node D of the logical address. Correspondingly, the storage node D receives the to-be-written data and computes fingerprint information of the to-be-written data, and then searches to determine whether the fingerprint information of the to-be-written data exists in the storage node and another storage node (FIG. 3 shows only a storage node E, but the storage node is not limited to the storage node E). If the fingerprint information of the to-be-written data is found, the to-be-written data is discards, and only the logical address and the corresponding fingerprint information of the to-be-written data are stored in the storage node D. If the fingerprint information of the to-be-written data is not found, the to-be-written data is persistently stored in the storage node D. It can be learned that, regardless of whether the to-be-written data is persistently stored in the storage node D, the compute node needs to first send, to the storage node D, the write request that carries the to-be-written data. In this way, a bandwidth resource between the compute node and the storage node is occupied.

For a problem of a long delay in the foregoing data reading process and a problem of occupying the bandwidth resource between the compute node and the storage node in a data writing process, an embodiment of this application provides a data storage system. In the data storage system, the compute node stores metadata, and the metadata may indicate an address at which target data is stored in a plurality of storage nodes. In this way, the compute node may directly read the target data from a corresponding storage node based on the address indicated by the metadata stored in the compute node, cross-node data forwarding does not need to be performed by using the plurality of storage nodes, and the metadata does not need to be searched for a plurality of times. This effectively reduces a data reading delay and improves a data reading speed. In addition, the metadata stored in the compute node may further include a fingerprint information set of deduplication data stored in the plurality of storage nodes. In this way, when writing data, the compute node may search the fingerprint information set stored in the compute node for fingerprint information of the to-be-written data. If the fingerprint information is found, the compute node directly discards the to-be-written data, records a correspondence between a logical address and the fingerprint information of the to-be-written data, and does not need to send a write request that carries the to-be-written data and the logical address to the storage node. This saves bandwidth between the compute node and the storage node.

It should be noted that the foregoing is merely some example application scenarios provided in embodiments of this application. It may be understood that the data storage system provided in embodiments of this application is also applicable to storage and access of common data such as non-deduplication data and non-snapshot data. The foregoing example scenarios do not constitute a limitation on application scenarios of the data storage system provided in embodiments of this application.

Figure 4A:
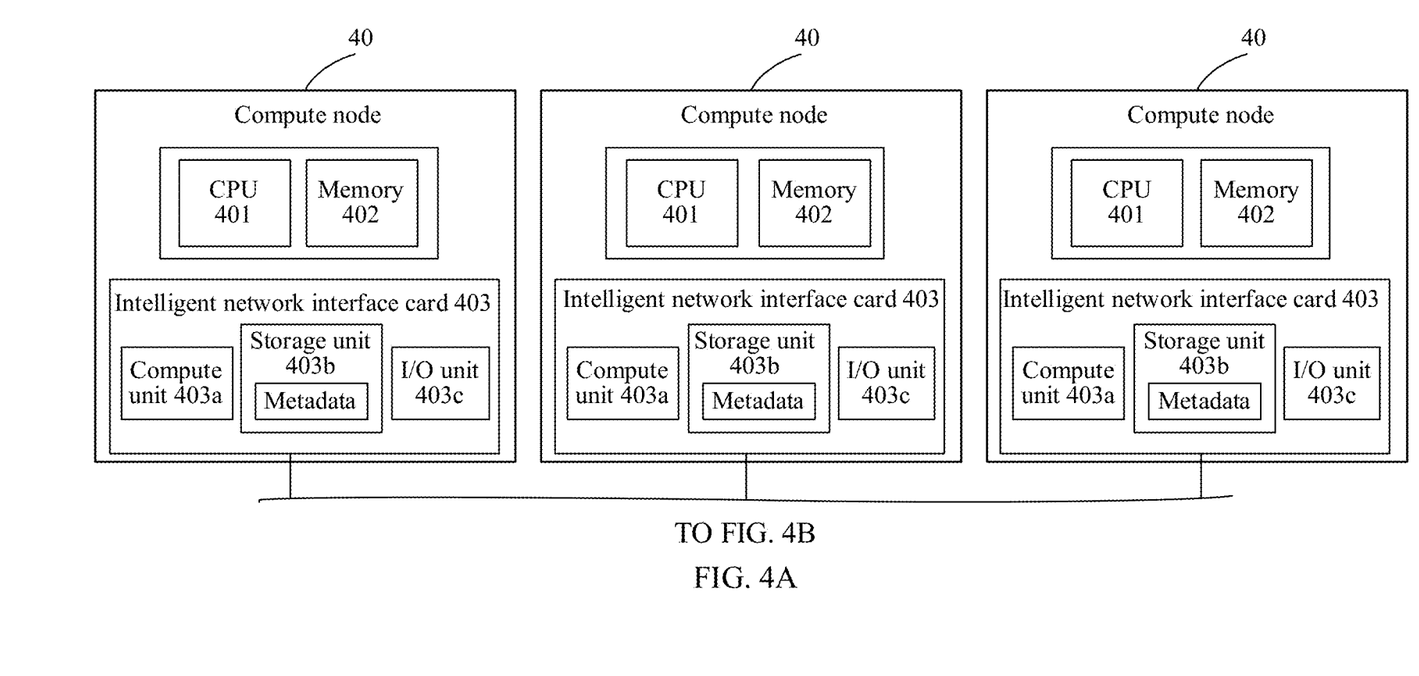
FIG. 4A and FIG. 4B are a schematic diagram of a structure of a data storage system according to an embodiment of this application.
Figure 4B:
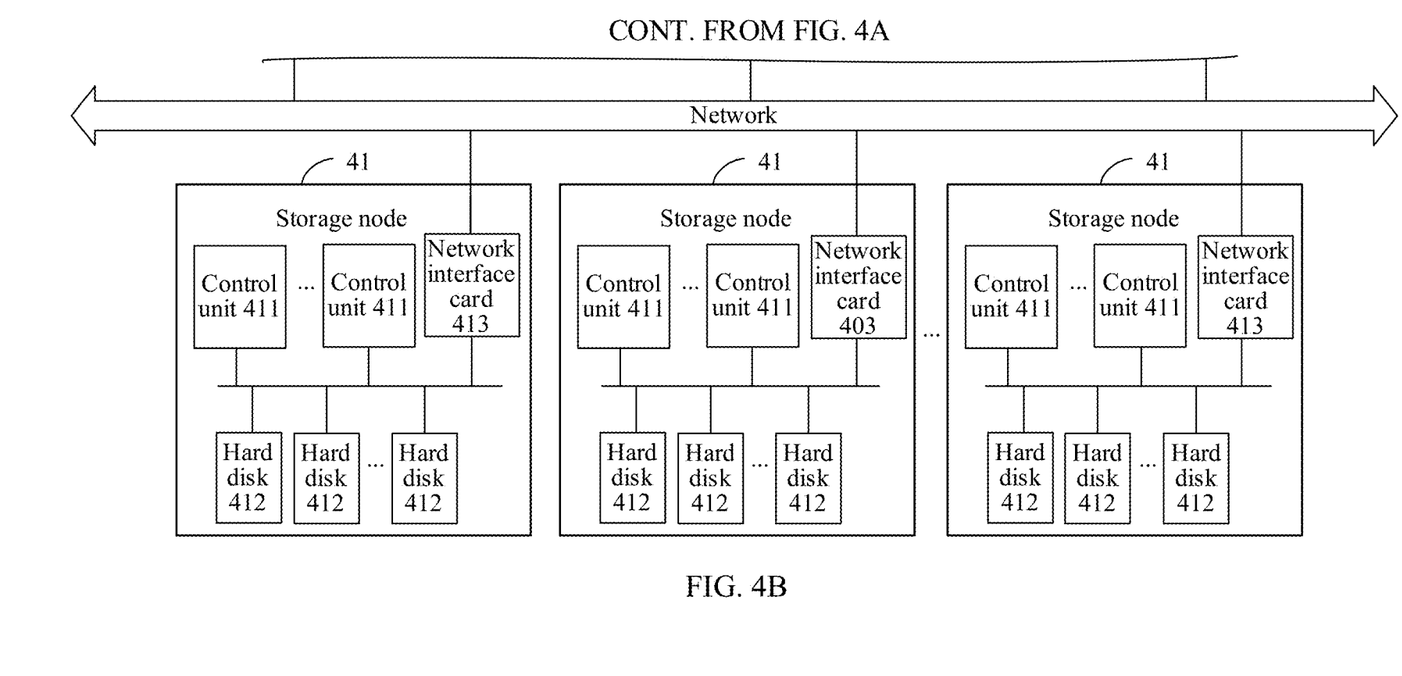

FIG. 4A and FIG. 4B are a schematic diagram of a structure of a data storage system according to an embodiment of this application. As shown in FIG. 4A and FIG. 4B, the data storage system includes a compute node cluster and a storage node cluster.

Figure 1:
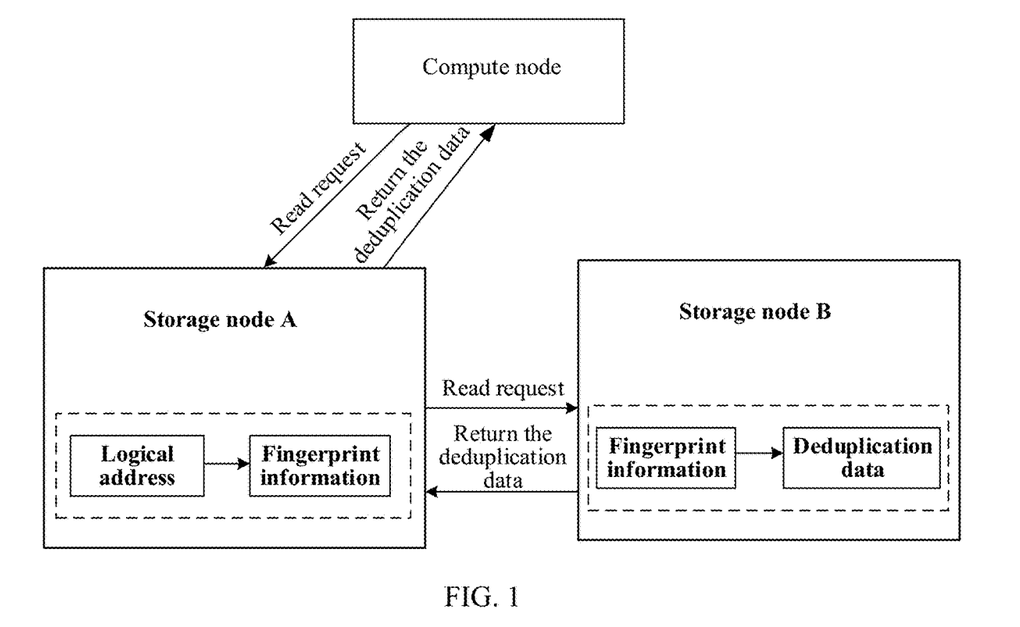
FIG. 1 is a schematic diagram of reading deduplication data in the conventional technology according to an embodiment of this application.

The compute node cluster includes one or more compute nodes 40 (FIG. 4A and FIG. 4B show three compute nodes 40, but is not limited to the three compute nodes 40), and the compute nodes 40 may communicate with each other. The compute node 40 is a user-side computer device, for example, a server, a desktop computer, or a controller of a storage array. It should be noted that, in embodiments of this application, a main function of the compute node 40 is to perform data computing and processing, for example, deduplication, data compression, data fragmentation, and multi-copy processing. At a software layer, an application and a client program may be run on the compute node 40. In terms of hardware, as shown in FIG. 4A and FIG. 4B, the compute node includes a processor 401, a memory 402, and a network interface card 403. The processor 401 is a central processing unit (CPU), and is configured to process a data access request from outside the compute node 40 or a data access request generated inside the compute node 40. In addition, the processor 401 is further configured to perform computing, processing, or the like on data. FIG. 1 shows only one processor 401. In actual application, there may be a plurality of processors 401, and one processor 401 further has one or more CPU cores. A quantity of processors and a quantity of CPU cores are not limited in embodiments.

The memory 402 refers to an internal memory that directly exchanges data with the processor 401. The memory 402 can read and write data at any time, and is in a high speed. The memory 402 is used as a temporary data memory of an operating system or another running program. In terms of hardware, the memory 402 includes at least two types of memories. For example, the memory may be a random access memory, or may be a read-only memory (ROM). For example, the random access memory is a dynamic random access memory (DRAM), or a storage class memory (SCM). The DRAM is a semiconductor memory, which is similar to most random access memories (RAMs) and belongs to a volatile memory device. The SCM uses a composite storage technology that combines both a conventional storage apparatus feature and a memory feature. The storage class memory can provide a higher read/write speed than a hard disk, but is slower than the DRAM in terms of an access speed and cheaper than the DRAM in terms of costs. However, the DRAM and the SCM are merely examples for description in embodiments, and the memory may further include another random access memory, for example, a static random access memory (SRAM). For example, the read only memory may be a programmable read only memory (PROM), an erasable programmable read only memory (EPROM), or the like. In addition, the memory 402 may alternatively be a dual in-line memory module or a dual-line memory module (DIMM), namely, a module formed by a dynamic random access memory (DRAM), or may be a solid state drive (SSD). In actual application, a plurality of memories 402 and different types of memories 402 may be configured in the compute node 40. A quantity of memories 402 and a type of the memory 402 are not limited in embodiments. In addition, the memory 402 may be a memory with a power protection function. The power protection function means that when a system is powered off and then powered on again, data stored in the memory 402 is not lost, and a memory having the power protection function is referred to as a non-volatile memory.

The intelligent network interface card 403 is configured to write data into the storage node 41 or read data from the storage node 41 by using data writing and reading methods provided in embodiments of this application. Refer to FIG. 4A and FIG. 4B. The intelligent network interface card 403 includes a compute unit 403a, a storage unit 403b, and an I/O unit 403c. The storage unit 403b stores metadata, and the metadata indicates an address at which target data is stored in a plurality of storage nodes. The compute unit 403a is configured to obtain the metadata from the storage unit 403b, and obtain the corresponding target data from a storage node 41 based on the obtained metadata by using the I/O unit 403c.

For example, the metadata stored in the storage unit 403b includes a correspondence between a logical address and physical address information, and the physical address information may be fingerprint information or a physical address of data. The compute unit 403a receives a read request delivered by the processor 401, where the read request includes a first logical address. Then, the compute unit 403a searches the correspondence that is between the logical address and the physical address information and that is stored in the storage unit 403b for first physical address information corresponding to the first logical address. If the first physical address information is found, the compute unit 403a reads, based on the found first physical address information, the target data from a corresponding storage node 41 by using the I/O unit 403c. If the first logical address information is not found, the compute unit 403a controls the I/O unit 403c to send a read request to the home storage node 41 of the first logical address, and receive the target data and the first physical address information that are sent by the home storage node 41. Then, the compute unit 403a correspondingly stores the received first logical address and the first physical address information in the correspondence in the storage unit 403b.

In addition, the storage unit 403b further stores a fingerprint information set, and the fingerprint information set includes fingerprint information of deduplication data stored in a plurality of storage nodes 41. The compute unit 403a may further receive a write request delivered by the processor 401, where the write request carries a second logical address and to-be-written data. Then, fingerprint information of the to-be-written data is computed, and the fingerprint information of the to-be-written data is searched for in the fingerprint information set stored in the storage unit 403b. If the fingerprint information of the to-be-written data is found, the second logical address and the fingerprint information of the to-be-written data are correspondingly stored in the correspondence in the storage unit 403b. Then, the to-be-written data is deleted, and the I/O unit is controlled to send the fingerprint information of the to-be-written data and the second logical address to a home storage node 41 of the second logical address. If the fingerprint information of the to-be-written data is not found, the compute unit 403a controls the I/O unit 403c to send a write request to the home storage node of the second logical address, so that the home storage node 41 of the second logical address persistently stores the to-be-written data based on the write request.

The compute unit 403a is further configured to: after the home storage node 41 of the second logical address stores the to-be-written data, search the correspondence that is between the logical address and the physical address information and that is stored in the storage unit 403b for physical address information corresponding to the second logical address, and if the physical address information corresponding to the second logical address is found, update the physical address information corresponding to the second logical address to the fingerprint information of the to-be-written data.

It should be noted that, in embodiments of this application, in terms of hardware, the intelligent network interface card 403 may be a programmable electronic component, for example, a data processing unit (DPU). The DPU has versatility and programmability of the CPU, but is more specialized, and can run efficiently on a network data packet, a storage request, or an analysis request.

Optionally, in some possible implementations, a function of the compute unit 403a in the intelligent network interface card may alternatively be implemented by the processor 401, and a function of the storage unit 403b may be implemented by the memory 402.

The storage node cluster includes the plurality of storage nodes 41 (three storage nodes 41 are shown in FIG. 4A and FIG. 4B, but the storage nodes are not limited to the three storage nodes 41). Different from functions of the compute node 40 for performing data computing and processing, a main function of the storage node 41 is to perform persistent data storage. Each storage node 41 includes at least one control unit 411, a plurality of hard disks 412, and a network interface card 413. The network interface card 413 is configured to communicate with the compute node 40. The hard disk 412 is configured to persistently store data. The hard disk 412 may be a disk or another type of storage medium, for example, a solid state drive or a stacked magnetic recording hard disk. This is not limited in embodiments of this application. The control unit 411 is configured to write data into the hard disk 412 or read data from the hard disk 412 based on a write request or a read request sent by the compute node 40. In a process of reading or writing data, the control unit 411 needs to convert a logical address carried in the write request or the read request into a physical address that can be identified by the hard disk. It can be seen that the control unit 411 also has some simple computing functions.

In actual application, the control unit 411 may have a plurality of forms. In an implementation, the control unit 411 includes a CPU and a memory. The CPU is configured to perform an operation, for example, address translation and data reading or writing, and the memory is configured to: temporarily store data to be written into the hard disk 412, or read, from the hard disk 412, data to be sent to the compute node 40.

In an implementation, a function of the control unit 411 may be offloaded to the network interface card 413. That is, the storage node 41 does not have the control unit 411, but the network interface card 413 completes data reading or writing, address translation, and another computing function. In this case, the network interface card 413 is also an intelligent network interface card. The intelligent network interface card may include a CPU and a memory. The CPU is configured to perform operations such as address translation and data reading and writing. The memory is configured to: temporarily store data to be written into the hard disk 412, or read, from the hard disk 412, data to be sent to the compute node 410.

Figure 5:
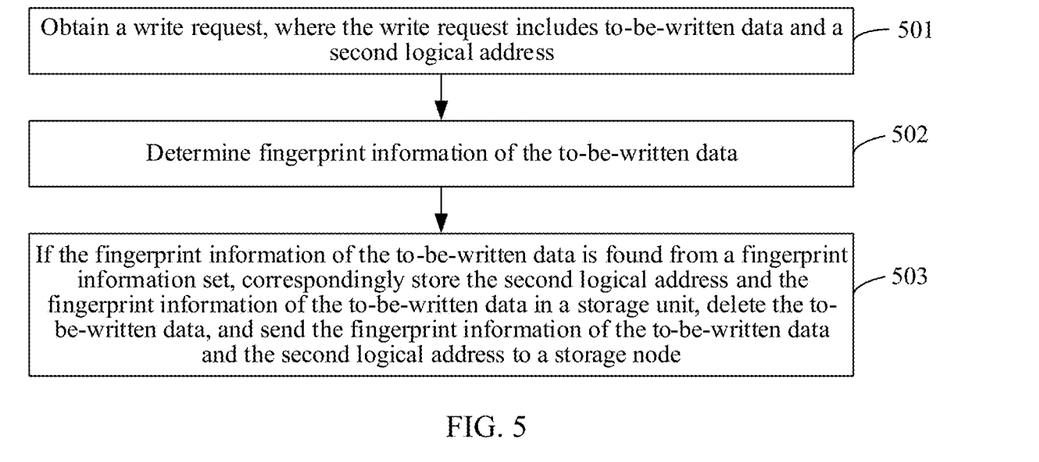
FIG. 5 is a flowchart of a data writing method according to an embodiment of this application.

In the foregoing data storage system, the compute node may write data into the storage node, or may read data from the storage node. FIG. 5 is a flowchart of a method for writing data into a storage node by a compute node according to an embodiment of this application. The method may be applied to the compute node in the data storage system shown in FIG. 4A and FIG. 4B, for example, may be applied to the intelligent network interface card included in a compute node. Refer to FIG. 5. The method includes the following steps.

Step 501: Obtain a write request, where the write request includes to-be-written data and a second logical address.

In this embodiment of this application, the compute node receives the write request from an external device or obtains the write request generated by an application deployed by the compute node. The write request includes the to-be-written data and the second logical address. The second logical address indicates a location at which the to-be-written data is to be written.

For example, a first logical address includes a logical unit number (LUN), a logical block address (LBA), and a data length, where the LBA indicates a start address of target data in the logical unit LUN, and the length indicates a length of the target data.

Step 502: Determine fingerprint information of the to-be-written data.

After obtaining the write request, the compute node obtains the to-be-written data in the write request, and computes the fingerprint information of the to-be-written data. Fingerprint information of data may uniquely identify the data.

In embodiments of this application, the compute node may compute a hash value of the to-be-written data by using a hash algorithm, and use the hash value of the to-be-written data as the fingerprint information of the to-be-written data. Certainly, the compute node may alternatively compute the fingerprint information of the to-be-written data by using another algorithm. This is not limited in embodiments of this application.

Step 503: If the fingerprint information of the to-be-written data is found from a stored fingerprint information set, correspondingly store the second logical address and the fingerprint information of the to-be-written data, delete the to-be-written data, and send the fingerprint information of the to-be-written data and the second logical address to the storage node.

In a possible implementation, the compute node stores metadata, and the metadata includes the fingerprint information set and a correspondence between a logical address and physical address information. The fingerprint information set stores fingerprint information of deduplication data stored in a plurality of storage nodes. It should be noted that fingerprint information in the fingerprint information set is obtained by updating in real time data that has been deduplicated in each storage node. Therefore, the fingerprint information set includes fingerprint information of data on which deduplication is completed last time in the plurality of storage nodes. The correspondence between the logical address and the physical address information includes a logical address and physical address information that are of the target data and that are stored in the plurality of storage nodes. For example, the correspondence includes a logical address that is accessed by the compute node in a recent period of time and corresponding physical address information. The physical address information may be the fingerprint information of the deduplication data, or may be a physical address that is of snapshot data or other common data and that is stored in the storage node.

Based on this, after determining the fingerprint information of the to-be-written data, the compute node searches the fingerprint information set for whether the fingerprint information of the to-be-written data exists, to determine whether the to-be-written data is deduplication data.

If the compute node finds the fingerprint information of the to-be-written data in the fingerprint information set, it indicates that the to-be-written data is one piece of deduplication data, that is, a storage node in a plurality of storage nodes already stores data that is the same as the to-be-written data. In this case, the compute node correspondingly stores the second logical address and the fingerprint information of the to-be-written data in the correspondence between the logical address and the physical address information. In addition, because the to-be-written data has been stored in the storage node, the compute node deletes the to-be-written data. Similarly, the compute node may further determine a home storage node of the second logical address, and then the compute node sends the fingerprint information of the to-be-written data and the second logical address to the home storage node of the second logical address. Correspondingly, the home storage node of the second logical address receives the fingerprint information of the to-be-written data and the second logical address, and correspondingly stores the received fingerprint information and the second logical address.

Optionally, if the compute node does not find the fingerprint information of the to-be-written data from the stored fingerprint information set, it indicates that the to-be-written data may not be deduplication data. In this case, the compute node determines a home storage node of the second logical address. Then, the write request is sent to the home storage node of the second logical address. Correspondingly, after receiving the write request, the home storage node of the second logical address determines, through address translation, a physical address corresponding to the second logical address, and then stores the to-be-written data in the physical address corresponding to the second logical address.

Optionally, after successfully writing the to-be-written data into the corresponding physical address, the home storage node of the second logical address feeds back a write success notification to the compute node. After receiving the write success notification, the compute node searches the stored correspondence between the logical address and the physical address information for physical address information corresponding to the second logical address. If the physical address information corresponding to the second logical address is found, the physical address information corresponding to the second logical address is updated to the fingerprint information of the to-be-written data. It should be noted that, because the to-be-written data is just written into the second logical address, and a generation time point of the physical address information corresponding to the second logical address in the correspondence is earlier than a time point at which the to-be-written data is written into the second logical address, it can be learned that the physical address information corresponding to the second logical address in the correspondence is invalid. Therefore, the compute node may update the physical address information corresponding to the second logical address. Certainly, in a possible implementation, the compute node may directly delete the second logical address and the corresponding physical address information in the correspondence, and then reconstruct a correspondence entry between the second logical address and the fingerprint information of the to-be-written data. This is not limited in embodiments of this application.

In another possible implementation, the fingerprint information set may alternatively be stored in any one of a plurality of storage nodes. In this case, after obtaining the fingerprint information of the to-be-written data through computing, the compute node may search the fingerprint information set for the fingerprint information of the to-be-written data in a remote direct memory access (RDMA) manner, and perform a subsequent operation based on a search result with reference to the foregoing implementation. Details are not described in embodiments of this application again.

In embodiments of this application, the compute node or the storage node stores the fingerprint information set. After obtaining the write request including the to-be-written data and the second logical address, the compute node may first compute the fingerprint information of the to-be-written data, and then search the fingerprint information set for the fingerprint information of the to-be-written data. If the fingerprint information of the to-be-written data is found, the to-be-written data is deleted, only the second logical address and the fingerprint information of the to-be-written data need to be sent to the home storage node of the second logical address for corresponding storage, and the to-be-written data does not need to be sent to the home storage node of the second logical address. In this way, a bandwidth resource between the compute node and the storage node can be effectively saved.

Figure 6:
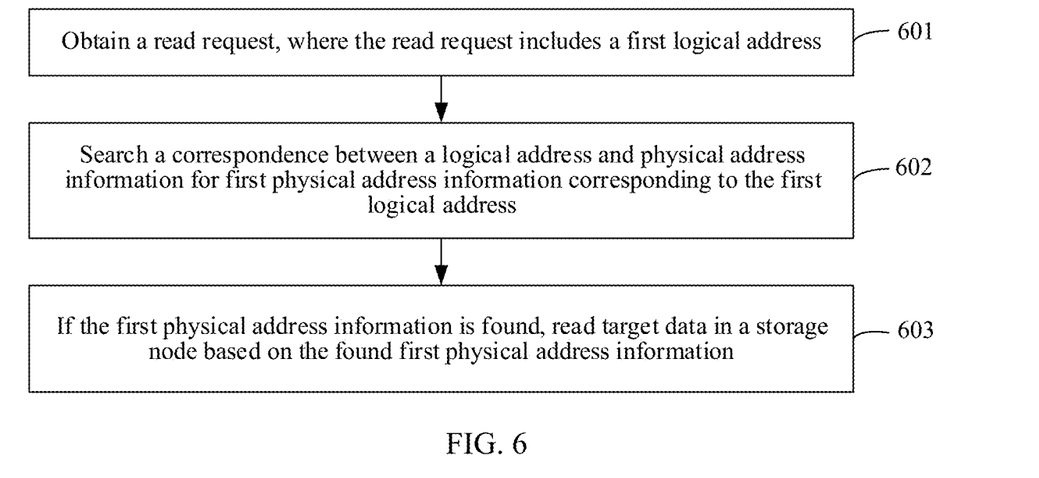
FIG. 6 is a flowchart of a data reading method according to an embodiment of this application.

FIG. 6 is a flowchart of a method for reading data from a storage node by a compute node according to an embodiment of this application. The method may be applied to the compute node in the data storage system shown in FIG. 4A and FIG. 4B, for example, may be applied to the intelligent network interface card of the compute node. Refer to FIG. 6. The method includes the following steps.

Step 601: Obtain a read request, where the read request includes a first logical address.

In this embodiment of this application, the compute node receives the read request from an external device or obtains the read request generated by an application deployed on the compute node. The read request includes the first logical address, and the first logical address indicates a logical address of to-be-read data. The first logical address includes a LUN, an LBA, and a length.

Step 602: Search a correspondence between a logical address and physical address information for first physical address information corresponding to the first logical address.

It can be learned from the descriptions in the foregoing embodiments that the compute node stores metadata, and the metadata includes the correspondence between the logical address and the physical address information. The physical address information included in the correspondence includes fingerprint information of deduplication data, or a physical address that is of snapshot data or other common data and that is stored in the storage node. Based on this, after obtaining the read request, the compute node searches, based on the first logical address included in the read request, the correspondence between the logical address and the physical address information for the first physical address information corresponding to the first logical address.

In a possible case, the correspondence may include physical address information corresponding to a logical address that has been accessed by the compute node in a recent period of time, but not include logical addresses and corresponding physical address information of all data that is persistently stored in a plurality of storage nodes. In this case, the compute node may find, in the correspondence, the first physical address information corresponding to the first logical address, or may not find the first physical address information corresponding to the first logical address.

Step 603: If the found first physical address information is found, read target data in the storage node based on the found first physical address information.

If the compute node finds, from the correspondence between the logical address and the physical address information, the first physical address information corresponding to the first logical address, because the first physical address information can directly indicate an address at which the to-be-read data is stored in the storage node, the compute node can locate, based on the first physical address information, a storage node that stores the to-be-read data, and then read the data from the storage node.

It should be noted that, it can be learned from the foregoing descriptions that the physical address information may be the fingerprint information of the deduplication data, or may be the physical address of the snapshot data or the common data.

Based on this, in a possible case, when the found first physical address information is a piece of fingerprint information, it indicates that the to-be-read target data is a piece of deduplication data. In this case, the compute node may compute, based on the found fingerprint information, a home storage node of the fingerprint information, namely, a storage node that stores the deduplication data. For ease of description, the home storage node of the fingerprint information is referred to as a first storage node in the following. Then, the compute node sends a read request to the first storage node, where the read request includes the found fingerprint information. After receiving the read request, the first storage node searches, based on the fingerprint information included in the read request, metadata stored in the first storage node for the first physical address corresponding to the fingerprint information, and reads the deduplication data stored in the first physical address. Then, the first storage node feeds back the read deduplication data to the compute node.

In another possible case, when the found first physical address information is a physical address, it indicates that the target data required by a user is a piece of common data or a piece of snapshot data. In this case, the compute node may determine, based on the found physical address, a home storage node of the physical address, that is, a storage node that stores the target data required by the user. For ease of description, the home storage node of the physical address is referred to as a second storage node. The compute node sends a read request to the second storage node, where the read request includes the found physical address. After receiving the read request, the second storage node reads, based on the physical address included in the read request, target data stored in the physical address, and feeds back the read target data to the compute node.

Optionally, if the compute node does not find, from the correspondence between the logical address and the physical address information, the first physical address information corresponding to the first logical address, the compute node may first determine, based on the first logical address, the home storage node of the first logical address. For ease of description, the home storage node of the first logical address determined by the compute node is referred to as a third storage node. Then, the compute node sends a read request to the third storage node, where the read request includes the first logical address. The third storage node receives the read request sent by the intelligent network interface card, and searches, based on the first logical address included in the read request, metadata stored in the third storage node for the first physical address information corresponding to the first logical address. If the found first physical address information is a physical address, it indicates that target data required by a user is stored in the third storage node. In this case, the third storage node directly reads the target data stored in the physical address, and returns the read target data, the first logical address, and the physical address corresponding to the first logical address to the compute node. Correspondingly, after receiving the target data, the first logical address, and the corresponding physical address that are sent by the third storage node, the compute node feeds back the target data to the user or provides the target data for a corresponding service, and stores the received first logical address and the corresponding physical address in the correspondence between the logical address and the physical address information.

If the first physical address information found, based on the first logical address, by the third storage node from the metadata stored in the third storage node is fingerprint information, and no physical address corresponding to the fingerprint information is found, it indicates that the target data required by the user is deduplication data, and the deduplication data is not stored in the third storage node. In this case, the third storage node may compute, based on the found fingerprint information, a home storage node of the fingerprint information, that is, a storage node that stores the deduplication data. For ease of description, the home storage node of the fingerprint information is referred to as a fourth storage node in the following. Then, the third storage node sends a read request to the fourth storage node, where the read request includes the found fingerprint information. After receiving the read request, the fourth storage node searches, based on the fingerprint information included in the read request, metadata stored in the fourth storage node for a physical address corresponding to the fingerprint information, and reads the target data stored in the physical address. Then, the fourth storage node returns the read target data to the third storage node. After receiving the target data sent by the fourth storage node, the third storage node returns the received target data, and the first logical address and the corresponding fingerprint information that are stored in the third storage node to the compute node. Correspondingly, after receiving the target data, the first logical address, and the corresponding fingerprint information that are sent by the third storage node, the compute node feeds back the target data to the user or provides the target data for a corresponding service, and stores the received first logical address and the corresponding fingerprint information in the correspondence between the logical address and the physical address information.

If the third storage node finds, based on the first logical address, a metadata set of a snapshot volume from the metadata stored in the third storage node, it indicates that the target data that the user wants to search for is a piece of snapshot data. In this case, the third storage node searches the metadata set for the physical address corresponding to the first logical address. If the physical address is not found, the third storage node continues to search the metadata set corresponding to a parent-level snapshot volume of the snapshot volume for the physical address corresponding to the first logical address, and so on, until the physical address corresponding to the first logical address is found. In this case, the physical address is the first physical address information corresponding to the first logical address. Then, the compute node directly reads the snapshot data stored in the physical address, and returns the read snapshot data, the first logical address, and the corresponding physical address to the compute node. Correspondingly, after receiving the snapshot data, the first logical address, and the corresponding physical address that are sent by the third storage node, the compute node feeds back the snapshot data to the user or provides the snapshot data for a corresponding service, and stores the received first logical address and the corresponding physical address in the correspondence between the logical address and the physical address information.

In embodiments of this application, the compute node stores the correspondence between the logical address and the physical address information. After obtaining the data read request, the compute node may directly search, for the physical address information corresponding to the first logical address based on the first logical address included in the read request, the correspondence that is between the logical address and the physical address information and that is stored in the compute node. Because the physical address information can indicate a location at which the to-be-read data is stored in the storage node, the compute node can directly read the target data from the home storage node of the physical address information based on the physical address information, and does not need to search for the target data from the plurality of storage nodes and perform cross-node data forwarding of or search for the metadata for a plurality of times. This effectively reduces a data reading delay and improves a data reading speed.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are not intended to limit the embodiments of this application. Any modification, equivalent replacement, or improvement made without departing from the spirit and principle of the embodiments of this application shall fall within the protection scope of the embodiments of this application.

What is claimed is:

1. A data storage system comprising:
 a compute circuit configured to obtain a write request comprising a logical address and to-be-written data, determine fingerprint information of the to-be-written data, obtain metadata, and read target data in a storage node based on the metadata comprising a fingerprint information set,
  wherein the fingerprint information set comprises fingerprint information of deduplication data stored in the plurality of storage nodes,
  wherein the storage node is among a plurality of storage nodes configured to persistently store the target data, and wherein the metadata indicates an address at which the target data is stored in the plurality of storage nodes;
a compute node configured to store the logical address and the fingerprint information of the to-be-written data,
wherein the compute node comprises an intelligent network interface card,
wherein the intelligent network interface card comprises a storage circuit, a compute circuit and an input/output (I/O) circuit,
wherein the storage circuit is configured to store the metadata, and
the compute circuit is further configured to, based on finding the fingerprint information of the to-be-written data is in the fingerprint information set,
store the logical address and the fingerprint information of the to-be-written data in the storage circuit,
delete the to-be-written data, and
control the I/O circuit to send the fingerprint information of the to-be-written data and the logical address to the storage node.

2. The data storage system according to claim 1, wherein the logical address is a second logical address, and wherein the metadata comprises a correspondence between a first logical address and physical address information, and the compute circuit is further configured to:
obtain a read request comprising the first logical address;
search the correspondence for physical address information corresponding to the first logical address; and
read the target data in the storage node based on the found first physical address information.

3. The data storage system according to claim 2, wherein the intelligent network interface card further comprises an input/output (I/O) circuit;
the compute circuit is further configured to, based on the first physical address information not being found, control the I/O circuit to send the read request to the storage node;
the storage node is configured to obtain the first physical address information, obtain the target data in the storage node based on the first physical address information, and send the obtained target data and the physical address information to the I/O circuit; and
the I/O circuit is configured to store the first logical address and the first physical address information in the storage circuit.

4. The data storage system according to claim 2, wherein the physical address information comprises the fingerprint information of deduplication data or a physical address of snapshot data.

5. The data storage system according to claim 1, wherein the compute circuit is further configured to, based on not finding the fingerprint information of the to-be-written data in the fingerprint information set, control the I/O circuit to send the write request to the storage node; and
the storage node is configured to store the to-be-written data based on the write request.

6. The data storage system according to claim 5, wherein the compute circuit is further configured to:
after the storage node stores the to-be-written data, search the correspondence for physical address information associated with the logical address; and
based on finding the physical address information associated with the logical address, update the physical address information associated with the logical address to the fingerprint information of the to-be-written data.

7. The data storage system according to claim 1, wherein the intelligent network interface card is a data processing unit (DPU).

8. An intelligent network interface card that stores metadata indicating an address at which target data is stored in a plurality of storage nodes, the intelligent network interface card comprising: and
an input/output (I/O) circuit, a storage circuit configured to store the metadata, and a compute circuit configured to obtain the metadata, and read the target data in the storage node based on the metadata,
wherein the intelligent network interface card is configured to obtain the metadata, and read the target data in the storage node based on the metadata,
wherein the metadata further comprises a fingerprint information set and
wherein the fingerprint information set comprises fingerprint information of deduplication data stored in the plurality of storage nodes; and
the compute circuit is further configured to obtain a write request comprising a logical address and to-be-written data, determine fingerprint information of the to-be-written data and, in response to determining the fingerprint information of the to-be-written data is in the fingerprint information set,
i. store in the storage circuit the logical address and the fingerprint information of the to-be-written data,
ii. delete the to-be-written data, and
iii. control the I/O circuit to send to the storage node the fingerprint information of the to-be-written data and the logical address, so that the storage node stores the logical address and the fingerprint information of the to-be-written data.

9. The intelligent network interface card according to claim 8, wherein the logical address is a second logical address, and wherein the metadata comprises a correspondence between a first logical address and physical address information, and the compute circuit is configured to:
obtain a read request comprising the first logical address;
search the correspondence for first physical address information associated with the first logical address; and
read the target data in the storage node based on the found first physical address information.

10. The intelligent network interface card according to claim 9, further comprising an input/output (I/O) circuit;
wherein the compute circuit is further configured to, based on not finding the first physical address information, control the I/O circuit to send the read request to the storage node; and
the I/O circuit is configured to receive the target data and the first physical address information obtained by the storage node based on the read request, and store the first logical address and the first physical address information in the storage circuit.

11. The intelligent network interface card according to claim 10, wherein the physical address information comprises fingerprint information of deduplication data or a physical address of snapshot data.

12. The intelligent network interface card according to claim 9, wherein the physical address information comprises the fingerprint information of deduplication data or a physical address of snapshot data.

13. The intelligent network interface card according to claim 8, wherein
the compute circuit is further configured to: based on the fingerprint information of the to-be-written data not being found in the fingerprint information set, control the I/O circuit to send the write request to the storage node, so that the storage node stores the to-be-written data based on the write request.

14. The intelligent network interface card according to claim 13, wherein
the compute circuit is further configured to: after the storage node stores the to-be-written data, search the correspondence for physical address information associated with the logical address; and based on the physical address information associated with the logical address being found, update the physical address information associated with the logical address to the fingerprint information of the to-be-written data.

15. The intelligent network interface card according to claim 8, wherein the intelligent network interface card is a data processing unit (DPU).

16. An intelligent network interface card comprising an input/output (I/O) circuit, a storage circuit configured to store metadata and a compute circuit configured to obtain the metadata, and read target data in a storage node based on the metadata,
wherein the metadata indicates an address at which the target data is stored in a plurality of storage nodes,
wherein information in the metadata includes a correspondence between a logical address and physical address information, and
wherein the metadata further comprises a fingerprint information set which comprises fingerprint information of deduplication data stored in the plurality of storage nodes; and
the compute circuit is configured to:
obtain a read request comprising a first logical address:
search the correspondence for physical address information associated with the first logical address;
obtain a write request comprising a second logical address and to-be-written data;
determine fingerprint information of the to-be-written data; and
based on the fingerprint information of the to-be-written data being found in the fingerprint information set, store the second logical address and the fingerprint information of the to-be-written data in the storage circuit, delete the to-be-written data, and control the I/O circuit to send the fingerprint information of the to-be-written data and the second logical address to the storage node, so that the storage node stores the second logical address and the fingerprint information of the to-be-written data.

17. The intelligent network interface card according to claim 16, further comprising an input/output (I/O) circuit;
the compute circuit is further configured to, based on not finding the physical address information, control the I/O circuit to send the read request to the storage node; and
the I/O circuit is configured to receive the target data and the physical address information obtained by the storage node based on the read request, and store the logical address and the physical address information in the storage circuit.

18. The intelligent network interface card according to claim 16, wherein the physical address information comprises fingerprint information of deduplication data or a physical address of snapshot data.

19. The intelligent network interface card according to claim 16, wherein the compute circuit is further configured to:
based on the fingerprint information of the to-be-written data not being found in the fingerprint information set, control the I/O circuit to send the write request to the storage node, so that the storage node stores the to-be-written data based on the write request.

20. The intelligent network interface card according to claim 16, wherein the intelligent network interface card is a data processing unit (DPU).

* * * * *